June 8, 1954  E. L. GRIFFIN  2,680,636
QUICK-ACTING COUPLING
Filed July 1, 1950

INVENTOR.
EUGENE L. GRIFFIN
BY Edward H. Eames
ATTORNEY

Patented June 8, 1954

2,680,636

UNITED STATES PATENT OFFICE 2,680,636

QUICK-ACTING COUPLING

Eugene L. Griffin, Bridgeport, Conn., assignor to Eastern Industries, Incorporated, East Norwalk, Conn., a corporation of Delaware Application July 1, 1950, Serial No. 171,615

6 Claims. (Cl. 287—119)

This invention relates to a shaft coupling of a quick acting type and more particularly relates to an improved sleeve type of coupling for connection of two shafts end to end, with means for quickly and easily locking or releasing at least one of the shafts.

The invention is particularly applicable to connection of a driven shaft to a driver shaft for rotation, with the sleeve coupling readily detachable from at least one of the shafts.

One example of use of a quick acting shaft coupling of this type is in portable mixing or stirring equipment where it is desired to attach a propeller shaft to a motor driven shaft, but where it is also desired to interchange propeller shafts readily for mixing different kinds or batches of materials or to accommodate change in viscosity of material.

The present invention provides a readily detachable shaft coupling of improved and simplified construction which is designed to hold a rotary shaft firmly in keyed position when in the attached condition but which is designed to permit quick and easy insertion and withdrawal of the shaft.

According to a preferred form of the invention the coupling comprises a sleeve having a proper inner diameter for slight clearance from the desired shaft size with provision for permanent or semi-permanent attachment for one shaft by set screws or other suitable means. An opening is cut in the sleeve to provide for a key transverse to the axis of the coupling and a collar is provided to slide over the sleeve and key to wedge the key in a transverse keyway on a second shaft in normal operating condition, thus connecting the two shafts. The collar can be urged to the wedging position by gravity if the shafts are in the appropriate vertical or near vertical position or the collar can be retracted against a return spring to provide for universal use in any position. The retraction of the collar frees the key so that the detachable keyed shaft may be readily slipped in and out of position.

It is a general object of the invention to provide an improved shaft coupling for quick locking and release of a shaft, featuring simplicity of design and ease of manufacture.

It is another object of the invention to provide an improved shaft coupling which wedges a shaft in locked position by means of a key wedged against a keyway in the shaft by an overriding collar, but which by simple retraction of the collar over the sleeve, permits the release of the shaft, the coupling being designed for floating action of the key by having the key so retained as to allow considerable transverse rocking motion as well as radial motion when not in locked position.

It is a further object of the invention to provide an improved quick release shaft coupling comprising a sleeve attachable to one shaft and providing for the insertion of a second shaft, with a transverse key to engage a transverse keyway in the second shaft, together with an overriding collar urged to a position wedging the key in the keyway when the second shaft is fully inserted and retractable against gravity or against a spring to permit quick insertion or release of the second shaft.

It is another object of the invention to provide an improved quick release shaft coupling comprising a sleeve attachable to one shaft and providing for the insertion of a second shaft, with a transverse key to engage a transverse keyway in the second shaft, together with an overriding collar to wedge the key into the keyway when second shaft is fully inserted, such collar in normal locked or wedging position extending slightly past the end of the sleeve so that it is possible readily to retract the collar from such wedging position by tapping the end of the collar.

It is a further object of the invention to provide an improved quick acting shaft coupling comprising a sleeve attachable to one shaft and providing for the insertion of a second shaft, with a transverse key to engage a transverse keyway in the second shaft, together with an overriding collar to wedge the key into a locked position in the keyway, the said key being so retained in the sleeve that it has considerable freedom of motion when not in the locked position, whereby the second shaft need not be inserted with its keyway in exact alignment with the key but will be urged into proper alignment by the key as a consequence of the normal wedging action of the collar.

Referring now to the drawings.

Figure 1:
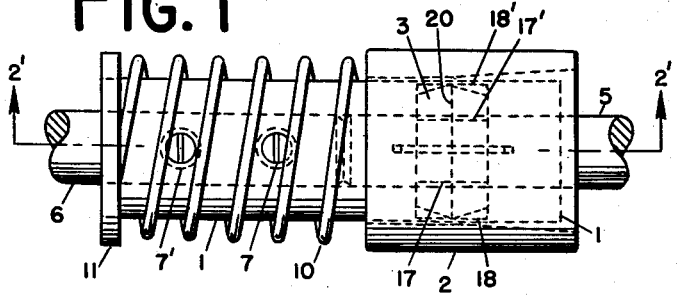
Fig. 1 shows a full top view of the shaft coupling with the shafts fully inserted and with the releasable shaft in its normal locked operating condition.
Figure 6:
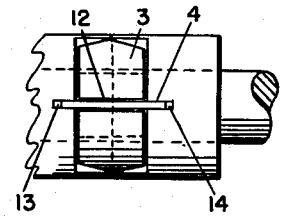
Fig. 6 is the same as the right part of Fig. 1 except that the collar has been removed in order to show the key and key retaining pin in the sleeve more clearly.
Figure 2:
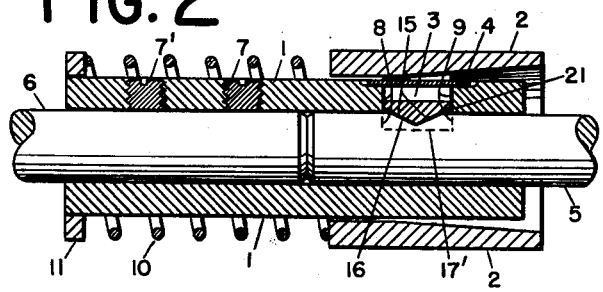
Fig. 2 shows a sectional view of the coupling in vertical section through its axis as shown by the line 2'—2' in Fig. 1, with the shafts fully inserted and the releasable shaft in its normal locked operating condition.
Figure 3:
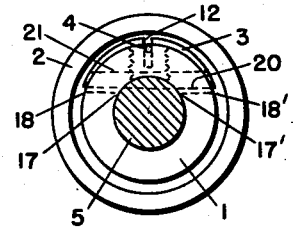
Fig. 3 shows a right end view of the coupling of Figs. 1 and 2, in full vertical view.
Figure 4:
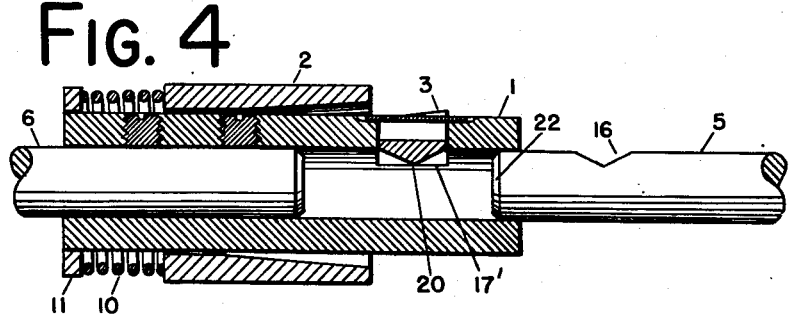
Fig. 4 shows the same sectional view of the coupling as in Fig. 2 but with the collar in retracted position and the releasable shaft in an intermediate position while being inserted or removed from the coupling.
Figure 5:
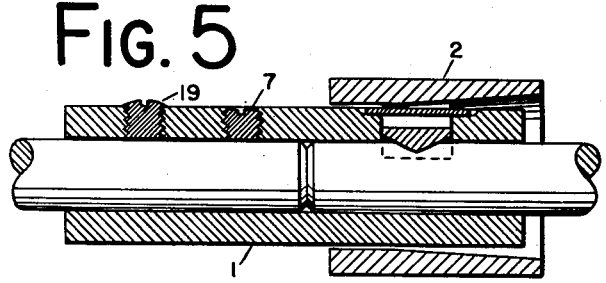
Fig. 5 shows the coupling as in Fig. 2 but without the retaining spring and shoulder, this form of the invention being appropriate when the coupling is to be used only in the proper vertical or near vertical position so that the collar will be urged to the wedging position by gravity.

Thus Figs. 1-3 show one form of the coupling in its normal locked or operating position with the shafts fully inserted and Fig. 5 shows another form of the coupling in corresponding position, while Fig. 4 shows the first form of the coupling in its released position. In the following description it will be noted that the corresponding elements in the several figures have the same reference character and some elements may be more readily seen in one figure than in another.

Referring now to Fig. 2, the coupling according to one form of the invention is shown in vertical section through its axis in its normal locked position with shafts 5 and 6 fully inserted. The shaft 6 at the left side of the figure is fixed to the coupling and is shown in full view. The shaft 5 is releasable from the coupling and is also shown in full view.

The coupling includes the sleeve 1 which is of generally hollow cylindrical shape providing slight clearance for the insertion of the shafts. The sleeve 1 is attached to the left hand shaft 6 by the set screws 7 and 7' or by other suitable means. The set screws may bear against a flat on the shaft or depressions in the shaft for example if desired.

The sleeve 1 has an opening in its upper part transverse to the axis of the sleeve, formed by a cut substantially perpendicular to the sleeve axis and extending part way down through the sleeve as indicated in Fig. 2, the sides of the cut in the sleeve being shown by vertical lines 8 and 9, these sides being joined at their bottom edges by a surface substantially parallel to the sleeve axis forming edges 17 and 17' at the inner surface of the sleeve 1 and edges 18 and 18' at the outer surface of the sleeve.

This opening 8—9 provides for key 3, which is free to move up and down in the opening as guided and retained by the pin 4, there being a slot 12 in the middle of the top of the key to accommodate this pin.

The pin 4 is located across the opening 8—9 in sleeve 1 parallel to the sleeve axis and just below the surface of the sleeve so that it will not interfere with the motion of the collar 2. This pin 4 is retained in the narrow slots 13 and 14 in sleeve 1 which are located at either side of the opening 8—9 alongside the top center of that opening. The pin 4 may be retained in the slots 13 and 14 by swaging, for example.

The key 3 has vertical edges to the right and left as shown in Fig. 2 so as to just clear the sleeve 1 at the sides of the opening 8—9. The bottom 15 of the key has a broad V shape, sloping upward away from the sleeve axis on both sides of the bottom center 20 of the key, and this sloping bottom of the key engages a similarly shaped keyway 16 across the top of the releasable shaft 5, these features being best shown in Figs. 2 and 4. This shape of the key 3 and keyway 16 serves to deflect the key outward upon the insertion or removal of the shaft 5 when the collar 2 is retracted to the left from the key. Due to the corresponding shapes of the bottom 15 of the key and of the keyway 16 there is a broad surface of contact and consequent snug fit in the operating position as shown in Fig. 2.

Figure 7:
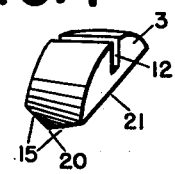
Fig. 7 is a perspective view of the key.

The top of the key has a slightly conical or nearly cylindrical surface, the radius of curvature at the left end of the key being approximately the same as that of the outside of the sleeve and increasing gradually to the right as best shown in Fig. 4 and Fig. 7, giving an outward slope at the surface of about three or four degrees from the axis. In some of the figures of the accompanying drawing this slope appears exaggerated to some extent for clarity.

The slot 12 in key 3 appears in full view in Fig. 7 and in broken lines in transverse view in Fig. 3. One face of this slot appears in full view in the section of the key 3 shown in Figs. 2, 4 and 5. The slot 12 is deep enough so that the key will completely clear the inner diameter of the sleeve 1 for insertion or removal of the shaft 5 when the collar is retracted as in Fig. 4.

The slot 12 is substantially wider than pin 4 so that the key 3 is free to move radially and to rock about pin 4 as an axis when not locked in position by collar 2, whereby the key may engage the keyway 16 of shaft 5 when the keyway is only approximately aligned with the key 3, the subsequent wedging action of collar 2 then bringing shaft 5 with its keyway 15 into correct alignment with the key. Though this freedom of motion, or floating action, is considerable, the key 3 is retained in the sleeve opening 8—9 by the pin 4, the opening 8—9 being deep enough to allow the key 3 to drop nearly within the outside diameter of the sleeve 1 but not deep enough to allow the key to slide out from under the pin 4, the key being long enough transverse to the sleeve so that the key is restricted from too great a rotation by the ends striking the portions of the sleeve 1 at the bottom 17—18 or 17'—18' of the opening 8—9.

As best shown in Figs. 1, 2, 4 and 5, the collar 2 is a short outer sleeve of generally hollow cylindrical shape, the outer diameter being preferably constant. Over a part of its length at the left end of the collar the inner diameter is constant and such as to allow slight clearance of the outside diameter of the sleeve 1 over which it moves. Over the remainder of the length of the collar 2 the inner diameter increases gradually to the right in these figures so that the inner surface has an outward slope the same as or very slightly less than the slope on the top of the key 3, giving wide bearing surface with consequent snug and secure fit in the locking or wedging position.

In the preferred form for universal use in all positions a spring such as the coil spring 10 is employed around the sleeve 1 between the left side of the collar 2 and a shoulder 11 on the left end of sleeve 1. Shoulder 11 may be secured to sleeve 1 by any of well known means, such as a force fit for example, or the shoulder 11 may be a part of the sleeve 1. However for certain applications where the axis of the coupling and the shaft are in a nearly vertical position, with the right end of the coupling lower than the left end, the force of gravity on the collar 2 will urge this collar to the right as it appears in Fig. 5, thus wedging the key in the keyway, so that under certain circumstances the spring 10 may be omitted if desired, as shown in Fig. 5. In this case the shoulder 11 may also be omitted in some cases. A means of keeping the collar 2 from slipping off the left end of sleeve 1 may be afforded by causing the head of one of the set screws to project beyond the surface of the sleeve as shown by the set screw 19 in Fig. 5, or the coupling may be mounted close enough to the drive motor hub (not shown) so that there is not space for the collar to slide off the left end of the sleeve, for example.

In normal locked position the right end of the collar 2 extends slightly past the right end of the sleeve 1 so that it is readily possible to strike a blow to the end of the collar in order to release the collar from the wedging position if necessary.

The sleeve 1, collar 2, key 3, and spring 10 may be made of steel or stainless steel for example although this is stated merely for purposes of illustration without intending to be limited thereby.

Fig. 4 shows the same view of the coupling as in Fig. 2 but with the collar retracted toward the left so as to permit key 3 to be deflected outward as occurs with the insertion or removal of the shaft 5 in the sleeve 1. The shaft 5 is shown completely clear of the key, the bottom edge of the key resting on the sleeve 1 at the bottom of the opening 8—9.

The key 3 is shown in Fig. 2 wedged against the bottom of the keyway in shaft 5. In this position the bottom of key 3 just clears the sleeve 1 at the bottom of the opening 8—9 so that the full force of the key acts against the shaft 5. When the shaft 5 is removed as in Fig. 4, the key 3 drops so that it rests on the sleeve 1 at the bottom 17—17' of the opening 8—9, the top of the key then projecting above the surface of the sleeve just enough to prevent the collar 2 from sliding off the right end of the sleeve, but allowing the collar 2 to project farther to the right than when the shaft 5 is in locked position. This arrangement, together with the shoulder 11 at the left end of the sleeve 5, serves to retain the collar on the sleeve.

It will be understood that the deflection of the key outward by the end of the shaft 5 upon insertion of the shaft is insured by either the sloping bottom 15 of the key 3 or the bevel 22 on the edge of the end of the shaft or both. It will be appreciated that if the end of the shaft is sufficiently beveled the insertion of the shaft may deflect the key even if the vertical flat side of the key projects slightly within the inner diameter of the sleeve so that the shaft bevel strikes the edge 21 of the key between the sloping bottom and the vertical side of the key.

However in the preferred form of the invention for substantial universal use where the end of the shaft may have only a slight bevel the key and keyway are designed so that the edge 21 will not fall appreciably within the inner diameter of the sleeve 1 when the shaft 5 is removed and the key is resting on sleeve 1 at the surfaces 17—18 and 17'—18'. As a consequence in this preferred construction the keyway 16 in the shaft 5 is not quite as wide as the key 3 or quite as deep as the beveled bottom part of the key, although the key and keyway have substantially the same slopes. Thus if the edge 21 of the key is approximately at the surface of the bore in the sleeve 1 in the unlocked condition with the key resting on the sleeve at the surfaces 17—18 and 17'—18' as indicated in Fig. 4, then this edge 21 will be raised slightly above or outside this bore as the key is deflected outward slightly so that the bottom of the key does not rest on the sleeve at the surfaces 17—18 and 17'—18' when the shaft is in the locked position, as indicated in Figs. 2 and 5.

It will be noted that by the two-way sloping wedge shape of the key and keyway parallel to the axis of the coupling the shaft is urged into the fully engaged locking position in the axial direction if the shaft 5 is nearly but not quite fully inserted, and by the disposition of the key and keyway transverse to the shaft axis approximating a segment of a circular cross-section of the sleeve and inserted shaft and allowing a floating or rocking motion of the key in approaching the fully locked position the shaft is urged through a rotational angle into the fully engaged locking position if the shaft 5 is nearly but not quite fully in the proper angular position for full engagement when inserted in the sleeve.

Referring to Fig. 3 for example, if the shaft 5 were inserted so that the right side of its keyway were higher than the left in the unlocked condition, the key 3 would rock in the opening 8—9 to accommodate this transverse sloping position of the keyway, and this would cause one end of the top of the key to project farther outside the sleeve than the other so that as the collar returned from its retracted position toward its locking position the key and shaft would be rotated until the key had a substantially full bearing on the collar as well as a substantially full bearing in the keyway, as shown in Fig. 3.

In this connection it will be appreciated that if the shaft 5 is inserted sufficiently closely for any appreciable part of the bottom of the key to engage the keyway the shaft will be urged into the proper axial and angular alignment for full-locking engagement by the wedging action. The considerable freedom for radial and rocking motion for the key provided by the transverse positioning and by the substantial transverse clearance and relative large radial depth clearance afforded for the pin 4 by the slot 12 in the key provides in effect a floating action of the key in the unlocked condition and in approaching the fully locked condition.

These features, together with the cooperating sloping surfaces of the collar and key, provide for automatic adjustment in the coupling for slight variations in shaft and coupling dimensions within manufacturing tolerances or due to wear.

Thus it will be observed that in accordance with the present invention a quick acting shaft coupling is provided which affords great simplicity of manufacture and also of action in insertion and release of a detachable shaft as well as in providing a firm locking grip on such shaft in the operating position by positive wide bearing and largely self-adjusting wedging action. It will be noted that the coupling may be manufactured primarily by straight cutting and turning operations and simple drilling operations, and that substantially a minimum of extra material or loss of material is involved in the combination of the coupling and the inserted detachable shaft in the operating condition so that this combination closely approaches a balanced assembly for rotation, and that there are no parts protruding appreciably at any one side of the axis in the operating condition so that there are no projections to catch on external objects while the coupling is rotating in its operating condition.

It will be obvious to those skilled in the art that the shaft 6 may be keyed to the sleeve 1 if desired, and it will similarly be obvious that the outer surface of the collar 2 may be knurled for convenience of grip and this purpose may be accomplished in any other well known manner if desired.

It will also be obvious to those skilled in the art that any of various well-known means may be employed in case it is desired to balance the coupling or assembly closely for rotation at relatively high speeds. Material may be added or subtracted on the coupling for example, holes being provided for this purpose in various angular positions and threaded for the insertion of weighted screws for example.

Although certain preferred embodiments of the invention have been illustrated and described and certain variations have been pointed out, it will be obvious to those skilled in the art that other changes in the various parts and of their arrangement might be made without departing from the spirit of the invention within the limits of the claims.

I claim:

1. A shaft coupling including a sleeve having an opening comprising a segment of the sleeve transverse to its axis, a key extending transverse to said axis in said opening and somewhat outside thereof and having a slot across the key extending axially and radially in the general plane of said axis, a pin secured in said sleeve across the opening parallel to the axis and cooperating with said slot for movably retaining said key in said opening, and a collar of shorter length than said sleeve and slidable along said sleeve to a position over and bearing against said key to urge said key toward said axis to wedge said key into a transverse keyway in a shaft inserted in said sleeve, said collar being retractable to another position along said sleeve to release said key from said shaft to permit withdrawal of said shaft, and in which a part of the sleeve at the bottom of the transverse opening in said sleeve affords a resting surface to engage the bottom of said key to assure projection of said key beyond the outer diameter of said sleeve to engage said collar in absence of any cooperating shaft in said sleeve, whereby said collar will be restrained from sliding beyond the key and off the sleeve.

2. A shaft coupling as in claim 1 and including shoulder means on said sleeve, and a coil spring bearing between said shoulder means and one end of said collar to urge said collar into wedging position over said key but to permit said collar to be retracted to the position releasing said key.

3. A rotary shaft chuck comprising a sleeve having an inner diameter to accommodate a rotary shaft and having an opening transverse to its axis and from its outer surface through its inner surface at one side of the axis, a key extending transverse to said axis in said opening and somewhat outside thereof and having a slot across the key extending axially and radially in the general plane of said axis, a pin secured in said sleeve across the top of the opening and parallel to said axis and cooperating with said slot for movably retaining said key, said key having a wedge shaped bottom adapted to engage a wedge shaped keyway in such shaft in rotary drive relation, and a collar slidable along the outer diameter of said sleeve having one position over said key to wedge said key in said shaft and slidable along said sleeve to another position to release the key to permit withdrawal of said shaft and in which a part of the sleeve at the bottom of the transverse opening in said sleeve affords a resting surface to engage the bottom of said key to assure projection of said key beyond the outer diameter of said sleeve to engage said collar in absence of any cooperating shaft in said sleeve, whereby said collar will be restrained from sliding beyond the key and off the sleeve.

4. A shaft coupling as in claim 6 and including spring means yieldably urging said collar toward said wedging position.

5. A shaft coupling as in claim 1, in which the sides of said key are transverse to said axis and the bottom surface of said key is sloped away from the axis of the coupling toward the sides of the key from the center of such surface of said key whereby said key will be deflected by insertion or withdrawal of the shaft having a similarly sloping keyway when said collar is retracted from its wedging position and in which the depth of the opening in said sleeve within the inner diameter of the sleeve is equal to or less than the depth of the bottom sloping surfaces of the key whereby when said key is resting on the sleeve at the bottom of the opening with the insertable shaft removed the insertion of the shaft will deflect the key outward to permit full insertion of the shaft.

6. A coupling for a rotary shaft having a transverse keyway, said coupling including an elongated sleeve of hollow cylindrical character, having an inner diameter to accommodate such shaft and having an opening through a part of its inner and outer circumferences comprising a segment of the sleeve transverse to its axis and formed as by a cut along a chord of the outer circumference intersecting the inner circumference at two substantially spaced points at one side of the axis, a key extending transverse to said axis in said opening and approximating such segment in size and shape but extending somewhat beyond such circumferences with a slight conical slope on its outer surface away from the axis of the coupling toward the end of the coupling from which the shaft is inserted, the bottom of said key extending generally along the chord of said segmental opening in said sleeve and having a generally wedge shape with a two way slope away from the axis of the coupling toward the sides of the key from the center of its bottom surface, said key having a slot across the key extending axially and radially in the general plane of said axis, a pin secured in said sleeve across the opening parallel to the axis and cooperating with said slot for movably retaining said key in said opening to provide for radial and transverse rocking motion of said key therein, and a collar of shorter length than said sleeve and slidable along said sleeve to a position over and engaging said key to urge said key toward said axis to wedge said key into a substantially matching wedge shaped transverse keyway in a shaft inserted in said sleeve, said collar being retractable to another position along said sleeve to release said key from said shaft to permit withdrawal or insertion of such shaft, said collar having an inner surface which slopes away from said coupling axis in substantially the same amount and direction as does said outer surface of said key, whereby said collar may engage said key when in approximate alignment with the keyway in an inserted shaft and the subsequent wedging action of said collar with a relatively large bearing surface will then bring said key and shaft keyway into correct alignment with a snug and secure fit in the fully wedged position.

References Cited in the file of this patent

UNITED STATES PATENTS

| Number | Name | Date |
|---|---|---|
| 361,391 | Bates | Apr. 19, 1887 |
| 608,448 | Gauthier | Aug. 2, 1898 |
| 691,449 | Craig | Jan. 21, 1902 |
| 943,863 | Clouse | Dec. 21, 1909 |
| 1,109,865 | Nugent | Sept. 8, 1914 |
| 1,124,981 | Weaver | Jan. 12, 1915 |
| 1,138,465 | Fegley | May 4, 1915 |
| 1,575,878 | Veith | Mar. 9, 1926 |
| 1,602,708 | Russell | Oct. 12, 1926 |
| 1,706,460 | Norling | Mar. 26, 1929 |
| 2,290,215 | Stenberg | July 21, 1942 |
| 2,386,469 | Iversen | Oct. 9, 1945 |
| 2,395,534 | Cook | Feb. 26, 1946 |
| 2,413,978 | Krone et al. | Jan. 7, 1947 |
| 2,470,256 | McIlroy | May 17, 1949 |
| 2,513,213 | Schick | June 27, 1950 |

FOREIGN PATENTS

| Number | Country | Date |
|---|---|---|
| 580,001 | France | Aug. 19, 1924 |